United States Patent
Furuhashi (10) Patent No.: US 6,527,954 B1
(45) Date of Patent: Mar. 4, 2003

(54) LAYERED BAG FILTER ELEMENTS

(76) Inventor: Susumu Furuhashi, 46-4, Sakuragaoka 1-chome, Yokosuka-shi, Kanagawa-ken (JP)

( * ) Notice: Subject to any disclaimer, the term of this patent is extended or adjusted under 35 U.S.C. 154(b) by 0 days.

(21) Appl. No.: 09/717,710

(22) Filed: Nov. 21, 2000

Related U.S. Application Data (63) Continuation of application No. 09/241,223, filed on Feb. 1, 1999, now abandoned.

(30) Foreign Application Priority Data

Feb. 5, 1998 (JP) ............................................. 10-37937

(51) Int. Cl.⁷ .......................... B01D 29/17; B01D 29/21
(52) U.S. Cl. .................... 210/315; 210/317; 210/323.2; 210/346; 210/486; 210/487; 210/489; 210/492; 210/493.2
(58) Field of Search ....................... 210/321.61, 321.75, 210/321.84, 321.86, 321.87, 485–487, 489–492, 493.1, 493.2, 493.5, 495, 497.01, 315, 317, 321.73, 321.74, 321.77, 321.82, 321.83, 323.2, 342, 346; 55/497, 500, 521, DIG. 5

(56) References Cited

U.S. PATENT DOCUMENTS

| 3,965,012 A | 6/1976 | Eguchi et al. |
| 4,588,642 A | 5/1986 | Ochiumi |
| 4,663,041 A | 5/1987 | Miyagi et al. |
| 4,980,060 A | 12/1990 | Muto et al. |
| 5,066,397 A | 11/1991 | Muto et al. |
| 5,401,403 A | 3/1995 | Hagqvist |

FOREIGN PATENT DOCUMENTS

| EP | 0472264 | 9/1992 |
| JP | 5343390 | 11/1978 |
| JP | 6447409 | 2/1989 |
| JP | 22838 | 2/1990 |
| JP | 541284 | 5/1993 |
| JP | 661431 | 8/1994 |

*Primary Examiner*—Matthew O. Savage
(74) *Attorney, Agent, or Firm*—Wood, Phillips, Katz, Clark & Mortimer (57) ABSTRACT

A filter element to be installed into a housing to constitute a filter assembly for separation of solids in a fluid is constructed from one or more baggy filtering mediums made of porous membrane or non-woven fabric of synthetic plastic, passageway material arranged along the inside and/or outside surface of the baggy filtering mediums depending on necessity and a sleeve joining with each opening of the baggy filtering medium(s). By adopting the baggy filtering mediums, it is possible to superimpose them into a filter element in a state of layers, and by adopting one baggy filtering medium folded repeatedly back and forth upon itself, it is also possible to construct another filter element in a state of layers, so as to fit to various filtration spaces in the housing. Accordingly, the space occupied by substantially parallel layered filtering medium(s) can be used densely for filtration, as the result a filtration area per unit filtration space is very large.

5 Claims, 1 Drawing Sheet

LAYERED BAG FILTER ELEMENTS

CROSS-REFERENCE

This application is a continuation of application Ser. No. 09/241,223, filed Feb. 1, 1999, now abandoned.

BACKGROUND OF THE INVENTION

1. Field of the Invention

The present invention relates to a filter element to be installed into a housing in order to constitute a filter assembly, which is composed of a non-woven fabric, porous membrane or the like for separation of solids from a mixture fluid that is a gas or a liquid, passageway material extending along the non-woven fabric, and a sleeve joining them together for installation into the housing.

2. Discussion on Related Prior Art

Various filtration technologies for separation of solids from a mixture fluid utilizing "non-woven fabric, porous membrane or the like (hereinafter referred to as porous thin film)" have been in wide use for filtering operation in the field of foods, pharmaceuticals, semiconductors or the like and a further development has been sought for. Namely, various functions of the porous thin film have been developed, and at the same time filter cartridges (although "filter cartridge" is defined as "the filter elements of pleat state, cylinder state, etc." in JIS K 3832, hereinafter "filter cartridge" is renamed "filter element" including "filter elements of bag state in the present invention", wherein JIS means Japanese Industrial Standard) and filter assemblies (hereinafter "filter assembly" is defined as "filter elements assembled in a housing or holder", as shown in JIS K 3832) have been also developed.

It is, however, well-known that passages in porous thin film become gradually blocked or clogged during filtration, accordingly a filtration rate decreases in separation of solids from a mixture fluid, and at last it is necessary in a filtration process to exchange the clogged filter assembly for another filter assembly which is arranged in parallel with the clogged filter assembly in order to continuously operate the filtration process. Then, it is laborious for an operator to exchange filter assemblies and replace with a new filter assembly or a new filter element whenever a filtration rate decreases. Besides, there even occur occasionally process shutdowns when he fails to exchange the filter assemblies or replace them with the filter assembly or the filter element.

Nevertheless, there has not always been spent a great deal of effort to improve a filter element made of a porous thin film and a filter assembly constituted of the filter element and "a housing" (hereinafter referred to as "a vessel containing an element", as shown in JIS K 3802), since there was developed "a folded tubular membrane filter element" having a central opening as a passageway for a filtrate, for example, as disclosed in Japanese Patent Application Publication Nos. 62-59962/1987 (corresponding to U.S. Pat. Nos. 4,588;464 and 4,663,041) and 5-41284/1993. Merely, there were other patent applications disclosing "a filter element having a filtering medium in the form of a spiral wound bag where screen mesh spacers are arranged along the inside and outside surface of the bag", which can increase a filtration area per unit volume of housing because of no necessity of a central opening, as shown in Japanese Patent Application Laid-Open Specification No. 2-2838/1990 (hereinafter the filter element is referred to as "a spirally wound bag filter element"), and another filter element to be named hereinafter "a bundled porous hollow fiber membranes filter element" in which porous hollow fiber membranes are bundled and joined with "two tube sheets" (although "tube sheet" is defined as "a portion for fixing the end of an opening of a hollow fiber membrane or a tubular membrane" in JIS K 3802, hereinafter it is redefined as including a portion for fixing an end of openings of baggy filtering mediums and a portion for fixing an end of an opening of a filtering medium in the form of a "pleats-folded" bag as explained in the present invention later) in Japanese Patent Application Publications Nos. 6-61431/1994, 7-34850/1995 (corresponding to U.S. Pat. Nos. 4,980,060 and 5,066,039, respectively).

However, there are also a lot of defects in the spiral wound bag filter element. Namely, a filtration surface at the inside of a filtering medium of the element is apt to be wrinkled due to winding a bag, made in advance as a radius of the element is small, so that it fails to function effectively during filtration, in addition the other filtration surface at the outside of the filtering medium is apt to be broken because of tension caused by winding the bag. From the aspect of bonding technology, it is almost impossible to form into the spirally wound bag without wrinkle and tension by bonding after winding spirally in advance two porous thin films with screen mesh spacers. Besides it is also difficult to increase the number of spirals, maintaining certainly each interval between adjacent spirals, and it is inevitably hard to expect a large flow rate of "a mixture of fluid and solid (hereinafter referred to as a supply fluid)" because there is only allowed a flow from the surface of a disc-shaped bottom of the spirally wound bag filter element, except the other flow from its peripheral surface, which cannot almost penetrate into its central portion.

On the other hand, there are also difficulties in the bundled porous hollow fiber membranes filter element, for example, it is almost impossible to expect a large flow rate in each of porous hollow fiber membranes, because it is difficult to maintain a form of each of the hollow fiber membranes, even if it can have a big inner diameter with its wall thickness thin and because it is also substantially impossible to insert support material into each of the porous hollow fiber membranes for reinforcement.

SUMMARY OF THE INVENTION

It is a main object to enlarge a filtration area per unit volume of filtration space in a housing or unit volume of filter element, in order to get a feed period of a supply fluid as long as possible, so that ample time is allowed for exchange of filter assemblies or the filter element in the assembly due to decrease of frequency of exchange and replacement.

It is another object to provide a novel manufacturing process for the filter element having a large filtration area per unit volume of filtration space.

According to the present invention, a filter element to be installed into a housing in order to constitute a filter assembly for separation of solids from a supply fluid containing solids comprises constructing a series of parallel layered elements obtained by dividing a filtration space in the housing in parallel with its lengthwise direction, from baggy filtering mediums made of a porous thin film, whose opening portions are joined fluid-tightly with a sleeve to be installed into a housing and which have interior layered passageways, and from exterior layered passageways between every two of the baggy filtering mediums adjacent to each other, one after the other so as to rebuild almost the whole of the optional filtration space, and equipped with passageway materials in at least either of both kinds of layered passageway.

At the same time, the present invention also attained another development derived from the above-mentioned filter elements for separation of solids from a supply mixture fluid. Namely, instead of a series of baggy filtering mediums made of a porous thin film having an equal depth and equipped with passageway materials, inside and outside, a few or preferably only one rectangular baggy filtering medium (therefore, which is longer in width) with the depth equipped with the passageway materials inside and outside, was "folded repeatedly back and forth upon itself in parallel with a lengthwise direction of the filter element, giving each width and thickness nearly equal to respective width and thickness of each of the series of layered elements, so as to form into a similar shape to the filtration space in the housing (hereinafter, referred also to as "pleats-folded", in order to describe in short)" and joined fluid-tightly at a pleated opening portion (or pleated opening portions in case of a few rectangular baggy filtering mediums) with a sleeve to be installed into the housing.

And also the present invention attained a method of joining a baggy filtering medium with a tube sheet comprising inserting a belt-like support with a necessary thickness made of synthetic plastic or metal into a portion of an incremental length of the baggy filtering medium(s), closing its opening, immersing into a liquid sealer to fix the portion, cutting the fixed portion to form newly one opening (or openings) and removing the belt-like support(s) remained in the baggy filtering medium(s) with a narrow width.

BRIEF DESCRIPTION OF THE DRAWINGS

In order to more fully understand the drawings used in the detailed description of the present invention, a brief description of each drawing is provided.

DETAILED DESCRIPTION OF THE INVENTION

First of all, there was investigated a folded tubular membrane filter element applied in conventional filtration as a representative filter element. The filter element is fashioned by folding repeatedly back and forth a rectangular porous thin film upon itself which is sandwiched by two supports (or named spacers) such as non-woven fabrics, nets and so on substantially equal in size to the rectangular porous thin film, by bonding both edges of the porous thin film which are parallel with pleats, to be in the form of a tube having a central opening and by joining a cap (or named an end-cap) having an opening with one terminal end of the tube so that these openings communicate with each other and another cap having no opening with the other terminal end of the tube. And the filter element is installed into a housing so that a supply fluid is fed from the outside of the tube and a filtrate is recovered from the inside of the tube, as shown in Japanese Patent Application Publications Nos. 62-59962/1987 (corresponding to U.S. Pat. Nos. 4,980,060 and 5,066,041) and, 5-41284/1993 or the like. As the result, there was found out an important fact in the filter element with a certain outer diameter that the number of pleats becomes small as the central opening is narrow though a width between pleats becomes large, on the other hand a width between pleats becomes small as the central opening is wide though the number of pleats becomes larger, and even though selecting the width between pleats and the number of pleats so as to get the maximum filtration area, its central opening is larger than a necessary one as a passage fitting in the filtration area. Namely there was not avoided the existence of any ruin space in the filter element.

Figure 1:
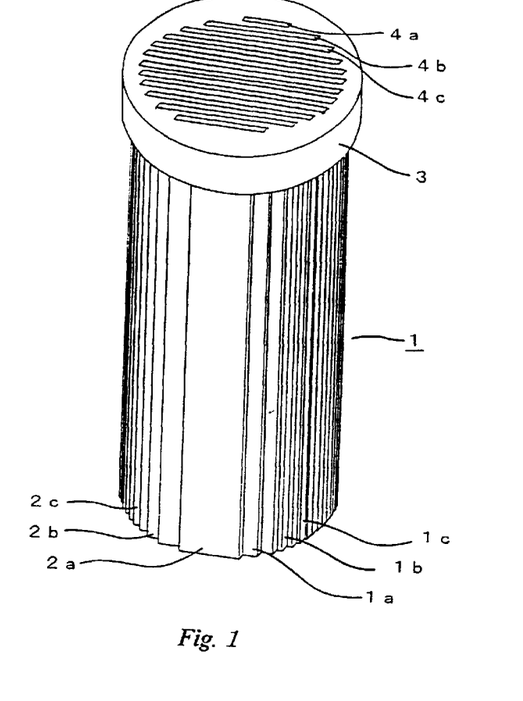
FIG. 1 is an embodiment of the basic concept of the present invention, where exterior passageway materials and baggy filtering mediums are arranged one after the other and joined with a sleeve.

One improved filter element without a so-called central opening to be installed into a housing, which may be named a layered bag filter element made of a porous thin film, is explained below, referring to the above-mentioned folded tubular membrane filter element. That is to say, a, series of thin and parallel layered elements obtained by dividing a cylindrical filtration space in a housing, in a lengthwise direction (in other words, in a direction extending from one terminal circle of the cylindrical filtration space in the housing to the other terminal circle) at a certain interval or different intervals, is replaced with baggy filtering mediums made of a porous thin film in which passageway materials are equipped with and whose opening portions are arranged in one lengthwise direction (1a, 1b, 1c,—in FIG. 1 are baggy filtering mediums), and with passageway materials (2a, 2b, 2c,—in FIG. 1 are exterior passageway materials) between every two of the baggy filtering mediums adjacent to each other, one after the other (like as 2a,1a,2b,1b,2c,1c,—in FIG. 1). And the replaced series of thin and parallel layered elements reconstructing nearly the original cylindrical filtration space as a whole are joined fluid-tightly with a sleeve (3 in FIG. 1 is a tube sheet as a sleeve) to be installed into the housing at the opening portions of the baggy filtering mediums, instead of a cap communicated with a central opening in an above-mentioned folded tubular membrane filter element. The opening portions of baggy filtering mediums communicate with opening portions (4a, 4b, 4c,—in FIG. 1) of the sleeve, respectively.

In this context, the cylindrical filtration space in the housing means a space having filtration function which is occupied by baggy filtering mediums, passageway materials, and a thin tubular space around the filter element for a flow of a supply fluid or "a permeate fluid (hereinafter defined as a fluid reducing solid content, including a filtrate)".

Outlines of the present invention may be also expressed that these filter elements can be positioned as taking up not demerits but merits resulting from various conventional filter elements. Firstly, a central opening in "a folded tubular membrane filter element" is not needed in the present filter elements as well as "a spiral wound bag filter element" and "a bundled porous hollow fiber membranes filter element". Secondly, adopting baggy filtering mediums, instead of a simple flat membrane, which are joined with a sleeve to arrange in a lengthwise direction and equipped with passageway materials inside and/or outside depending on necessity, the present filter elements as well as a spiral wound bag filter element can have a multiple layered structure, resulting in getting densely filtration function in a filtration space in a housing. However, according to the present invention, there is no wrinkle and no working of tension about the baggy filtering mediums because their structure is substantially a parallel multiple layered structure. And also in case of applying a few, preferably only one baggy filtering medium made of a porous thin film, a pleats-folded bag can be formed without wrinkle and tension about the baggy filtering medium because of folding repeatedly back and forth, not in one folding direction resulting in like as winding spirally. Thirdly, it is possible for the filter element to select various shapes of space in a housing, for example, multiple-cornered pillar including a three-cornered pillar, four-cornered pillar and so on, whereas a spiral wound bag filter element is restricted after all within a column. Fourthly, the filter element can secure necessary layered passageways inside and outside of the baggy filtering mediums by equipping with passageway materials appropriate in size and in physical and chemical properties, whereas it is difficult for a bundled porous hollow fiber membranes element to secure broad passageways inside and outside, especially inside of the bundled porous hollow fiber membranes.

Lastly, in particular, as the baggy filtering mediums and the passageway materials are superimposed densely in alternate layer so as to reconstruct the whole space in the housing, they are to support each other, playing a role to protect themselves mechanically and accordingly, it can be avoided that there occur localized flows caused by deforming the filter element. Therefore, it is also possible to design for the minimum dimension of layered passageways, considering exclusively an acceptable pressure drop based on fluidity rather than to design for passageway materials as supports, so long as the passageway materials are not required a role as pre-filter and/or post-filter. It was found out by experiment or calculation that a volume occupied by passageway materials and a void volume in a housing can be reduced considerably in comparison with the above-mentioned folded tubular membrane filter element and accordingly, its reduced volume is to create an additional filtration space resulting in some increase of filtration area.

A filter assembly for separation of solids from a supply fluid is called often a filter module separating solids and a liquid, or solids and a gas from respective mixtures, and is constituted of a filter element exhibiting function of separation and a housing installing the filter element for isolation from surroundings and equipped with an inlet of a supply fluid and an outlet of a permeate fluid. And a spade in the housing installing the filter element for filtration is generally in the form of a cylinder because of the fact that a housing of a type of tube is preferred because of easy installation and pressure tightness for most pressure filtration. However, there are also allowable other spaces in the housing in accordance with an applicable place, for example, in the form of an elliptical cylinder, a quadrangular prism or the like, so long as the filter element can be installed into each space, there is no obstruction in filtering operation and pressure tightness of the housing is satisfied.

In assembly of the housing and the filter element, the filter element equipped with a sleeve for installation into the housing is to be set up (or inserted, screwed, engaged by a ball head lock nut, tightened by a flange or the like to permit the removal and replacement of itself in one part of the housing divided into two, by means of various gaskets fitted to the sleeve, for example an O-ring and so on, and the other part is set up to form into a filter assembly by similar means mentioned above, in order to isolate the filter element from surroundings.

Also in assembly of an apparatus named often a disposable filter (defined as "the filter assembly made non-reusable" in JIS K 3833), the filter element is fixed in one part of the housing divided into two, at the portion of the sleeve by various bonding technologies including adhesion or fusion or the like, and the other part is fixed to form into a filter assembly made non-reusable by similar technologies.

According to the present invention, a series of layered elements is obtained by dividing the space in the housing in parallel with a lengthwise direction, and with thickness of each layered element equal or different, and the series of layered elements is reconstructed from baggy filtering mediums made of a porous thin film having passageways inside to be named interior layered passageways and from passageways outside of the baggy filtering mediums to be named exterior layered passageways, one after the other. And also at least either of both of layered passageways must be equipped with passageway materials, although it is not always necessary to be equipped with passageway materials in both of layered passageways. In other words, one group of the series of layered elements to be reconstructed from baggy filtering mediums is to be replaced with the baggy filtering mediums and their interior passageways are formed inside of each of the baggy filtering mediums and their exterior passageways as the other group of the series are formed outside of each of the baggy filtering mediums as clearances secured by joining each opening of the baggy filtering mediums with a sleeve for installation into the housing. The above-mentioned does not always restrict an arrangement order in replacement with the baggy filtering medium and the exterior passageway to reconstruct the series of layered elements one after the other, namely it is permissible whichever replacing the first layered element at the end of the space with the baggy filtering medium or the exterior passageway. When exterior passageway materials are used, it is preferable that both ends of the space divided are replaced with the exterior passageways.

In order to satisfy each thickness of one group of the series of layered elements to be replaced with baggy filtering mediums which must be joined with the sleeve for installation into the housing, their open extents or states at their joining portions are to reconstruct the layered elements in thickness and at the same time, in order to satisfy each interval between every two layered elements adjacent to each other that is each thickness of exterior passageways or each thickness of the other group of the series of layered elements to be replaced with the exterior passageways, there must be secured each interval between every two baggy filtering mediums adjacent to each other at the joining portions. According to the present invention, there is revealed filtration function of the baggy filtering mediums whenever using either of interior layered passageways and exterior layered passageways as layered passageways for a supply fluid or a permeate fluid. In the light of each fluid resistance (or pressure drop) caused by flow of the supply fluid and the permeate fluid, it is preferable that the layered passageways for the supply fluid is designed so as to show lesser fluid resistance with respect to pure fluid not containing solids, in comparison with the layered passageway for the permeate fluid. For example, in case of equipping with passageway materials with an identical function with respect to flow, inside and outside, it is preferable the layered passageways for the supply fluid are broader than ones for the permeate fluid.

The thinner a series of layered elements is divided, the more the number of baggy filtering mediums in the form of bags made of a porous thin film increases so that a broader filtration area can be obtained in a certain filtration space. On the other hand, each space occupied by each layered passageway decreases as the number of baggy filtering mediums increases, even though the porous thin film is small in thickness. Namely, an equivalent diameter (D=4S/L) of each layered passageway based on a wetted perimeter (L) around the cross-sectional area(S) of the layered passageway decreases so that there is naturally limitation in thickness of the series of layered elements, in the light of an acceptable pressure drop in the layered passageways. Besides there is also restriction that it is difficult to purchase passageway materials to be installed in the inside and outside of baggy filtering mediums and to join them to the sleeve for installation into the housing, when adopting the series of the layered elements which is too thin. Therefore, a lower limit of the series of layered elements in thickness must be determined, based on calculation or experiments in the light of physical properties of a supply fluid.

In addition to a series of layered elements in the filtration space of a type of cylinder in the housing, other series of layered elements in filtration spaces of other types are to be referred to as follows. For example, in case that the filtration space in the housing is a type of quadrangular prism, a series of layered elements in the form of flat boards obtained by dividing the filtration space in parallel with one of four planes extending in a lengthwise direction of the quadrangular prism is reconstructed from baggy filtering mediums at every other layered element and rested layered elements are exterior layered passageways between every two baggy filtering mediums adjacent to each other. And also, it is possible to reconstruct a series of parallel layered elements whose dimensions change one after another, in dividing the filtration space in parallel with a certain plane which does not intersect at right angles with any of four planes extending in a lengthwise direction of the quadrangular prism from baggy filtering mediums at every other layered element, and rested layered elements are exterior layered passageways between every two baggy filtering mediums adjacent to each other.

In comparison between a series of layered elements obtained by dividing the filtration space of a type of quadrangular prism in parallel with one of four planes extending in a lengthwise direction, and another series of layered elements obtained by dividing in parallel with a certain plane which doesn't intersect at right angles with any of four planes, the former layered elements are strict rectangular solids, on the other hand the latter layered elements are not rectangular solids in structure, in a strict sense of the word. However, according to the present invention it is permissible for the latter elements that each of filtering mediums and each of exterior layered passageways to be replaced with are regarded as the maximum rectangular solids or approximate rectangular solids put within these layered structures, besides, from the view points of matters resulting from manufacturing process and so on, it is understood as permissible change or modification to regard that neighboring layered elements are each other nearly approximate in size, because there are not almost caused change of passageway function and decrease of filtration area. The above-mentioned is also to be understood similarly in case of a series of layered elements obtained from a cylindrical space of filtration.

Moreover, in order to reconstruct each of forms of exterior passageways from passageway materials as faithful as possible or in order to simplify production of the filter element, it is permissible for the exterior passageway materials to adopt their sub-divisional thickness so as to superimpose those subdivided exterior passageway materials which are slightly different from each other in width of layered element. Namely, there is accepted modification to a certain extent, as shown in Example 1.

A filtering medium in the form of a bag made of a porous thin film which is bonded to a sleeve to be installed into a housing at its opening is, for example, a rectangular form that a rectangular sheet of porous thin film is folded at its middle line to bond both edge sides of the sheet crossing at right angles with the middle line. That is, the rectangular form is to be understood like as an envelope made of a porous thin film whose upper part is cut off by 1 to 2 cm in length, in other words an envelope without a flap and a concave portion. In order to obtain a larger interior passageway in thickness in the filtering medium, it is acceptable to apply not the above rectangular filtering medium but a filtering medium having necessary thickness like as a bag with flat sides and a flat bottom for thick documents.

Moreover various types of bag made of a porous thin film can be adopted as a filtering medium in accordance with filtration spaces in a housing so long as they can be joined with the sleeve, their filter element with the sleeve can be installed into the housing and their filtration function can be revealed. For example, it is able to adopt a filtering medium that a bottom part of the bag is not always in the form of a straight line or a flat surface but also in the form of a semicircle, a semielliptical or arcs as their parts in accordance with the form of a filtration space in a housing having a hemisphere or a hemi-ellipsoid and so on. And besides, in accordance with the form of a filtration space in a housing that the deeper, the narrower its form changes like as a cone or its part, it is permissible to adopt a bag like as a triangle or its part that the deeper, the shorter the distance between both sides of a filtering medium is.

In order to fashion a baggy filtering medium, there are applicable conventional technologies bonding porous thin film edges each other by means of adhesion and/or fusion applying various heating methods, that is, conduction, radiation, friction or the like, in addition, indirect fusion by placing a non-porous thin film between the edges which is a medium having a necessary width to be fused and a lower melting point in comparison with the porous thin film. For example, in bonding indirectly porous thin films made from polytetrafluoroethylene there is placed a film made from various polyolefines, various copolymers of, for example, tetrafluoroethylene and perfluoroalkylvinylether, tetrafluoro-ethylene and hexafluoropropylene, ethylene and tetrafluoroethylene and so on, between their edges to be bonded.

It is necessary that a baggy filtering medium made of a porous thin film has "an incremental length in lengthwise direction" to be called an axially-extending length to join with a sleeve for installation into a housing, which must be added to an opening portion of the baggy filtering medium. The incremental length implicates also extension of the porous thin film itself, and it can be also enforced by bonding a synthetic plastic thin film to its inside and/or outside, along a peripheral line or plane of the opening portion of the baggy filtering medium, like as disclosed, for example in U.S. Pat. No. 4,392,958. Moreover, it is permissible to bond a circular band of the thin film having a width similar to the incremental length and a periphery equal to a length around the opening of the baggy filtering medium. A method and a position of bonding the circular band as well as its thickness must be designed so as not to increase fluid resistance.

However, it is still difficult to maintain each designed thickness of a series of inside and outside layered passageways of baggy filtering mediums throughout the filter element during filtration, though there is bonded each of the baggy filtering mediums based on the series of layered elements decided as described already, to a sleeve for installation into a housing in order to secure the state of each opening of the baggy filtering mediums. In other words, exterior surfaces of the baggy filtering mediums contact with each other with the exception of a case that each depth of the baggy filtering mediums is very shallow and each interval between the baggy filtering mediums is long, an inside wall of the housing contacts with baggy filtering mediums, and interior surfaces in a baggy filtering medium contact with each other, accordingly, it takes place that filtration area is not always used efficiently during filtration. There is also caused a case of instant damage in a filter element because porous thin films sandwiching solids caught on their surfaces rub with each other due to the solids, even if filtration functions at first. Besides there is caused another case of reducing an effective filtration area as porous thin films contact with each other in the baggy filtering medium because of flexibility based on thinness of the films even though the baggy filtering medium has a certain thickness resulting from side surfaces and a bottom surface.

Among the above-mentioned, the case of contact between the baggy filtering medium and the inside wall can be avoided by enclosing the filter element with, for example, a thin non-woven fabric having a large permeability or a cover in the shape of a tubular vessel made of synthetic plastic with many big perforated holes, preferably a cover divided into two in central axial direction, on condition that each divided cover is unified later and preferably joined with the sleeve. However, the other cases are unavoidable. Shortly describing, it is mostly difficult to make the filter element function fully, by means of joining merely baggy filtering mediums with the sleeve.

In order to avoid the other cases, that is to say, in order to secure layered passageways inside and outside of baggy filtering mediums, it is necessary not only to secure thickness of openings by joining baggy filtering mediums with the sleeve for installation into a housing but also to secure thickness as a whole by arranging layered passageways along the inside and/or outside surface of baggy filtering mediums with passageway material with thickness appropriate and with fluid resistance as small as possible, for example, non woven fabric having small "metsuke (hereinafter, defined as weight per unit area)", fine and swelling net, or bulky and coarse textile. As the result, it becomes possible to avoid the other cases, or to secure filtration area and to avoid damage in surfaces of the porous thin film because of no contact with each other. Words "passageway material" used so far in the present specification means "non-woven fabric, net, textile and so on having functions described concretely above".

It is permissible for a passageway material to be inserted mechanically in each passageway, to be bonded partly by adhesive or fusion to the porous thin film, especially at portions where both side edges of a folded porous thin film are bonded to form into a bag at the time of forming the bag or later, or to be bonded, if necessary, together with a non-porous film to be superimposed as explained already, so long as filtration functions. Moreover, in applying a filtering medium in the form of a pleats-folded bag, it is permissible to fashion the pleats-folded bag which is equipped with an interior passageway material and two exterior passageway materials on an inside and two outsides of the bag, respectively.

It is preferable that a passageway material used to secure a layered passageway on the outside of a filtering medium is in the form of a bag in which the baggy filtering medium is held tightly, namely forming apparently a double bag results in protecting the baggy filtering medium as a whole, including its bottom surface. Although it appears as if there are two passageways outside of the baggy filtering medium because two sheets of passageway material are superimposed outside of the baggy filtering medium when folding the double bag into a double pleats-folded bag, according to the present invention it is to be regarded that a 2-sheets-in-a-set passageway forms one exterior layered passageway. Therefore, there also exists invariably the fact that the baggy filtering mediums and the exterior passageways exist one after the other. Under appropriate selection of material, it is possible as a modification of the. double pleats-folded bag that the porous thin film sandwiched between two passageway materials is folded at its middle line and its both side edges are bonded respectively to be formed into a new double bag which is folded repeatedly back and forth upon itself so as to rebuild a filtration space and it is also possible to bond the both side edges respectively after forming pleats.

And it was also found out to be permissible that only passageway materials to be equipped with passageways for a supply fluid may be omitted, though strength of a filter element decreases a little. In other words, it is permissible to omit passageway materials to be equipped with interior passageways of the baggy filtering mediums in case that a supply fluid is fed in the interior passageways, and it is also permissible to omit passageway materials to be equipped with exterior passageways of the baggy filtering mediums in case that a supply fluid is fed in the exterior passageways. In the former case, especially in the case of recovering solids contained in the supply fluid as object substances of filtering operation, they are retained in the baggy filtering mediums since the supply fluid is fed into the baggy filtering mediums having no interior passageway materials, so that it is very easy to recover them by cutting off the baggy filtering mediums after filtering operation.

Though a passageway material can be omitted as described above, it is not so difficult to maintain naturally a form of a layered structure for a supply fluid as a pressure of the supply fluid is always higher than one of the layered passageway for a permeate fluid. Besides, a passageway without a passageway material is characteristic of reduction in a pressure drop in the layered passageways of the supply fluid for lack of the passageway material. However, a rigid passageway material is required in a baggy filtering medium made of a porous thin film in case that the exterior of the baggy filtering medium is a passageway for the supply fluid, so that inner surfaces of each baggy filtering medium cannot contact with each other and don't deform in spite of outer flow. Especially, it is preferable to equip with a net made of a certain metal.

In order to reveal filtration function of a porous thin film, it is natural there exists a supply fluid on one side of both surfaces of a porous thin film and a permeate fluid on the other side and it is necessary to distinguish strictly two flows into inside and outside of the baggy filtering mediums, because it has no meanings in filtering operation that both flows contact and combine with each other during filtration. Therefore, interior layered passageways in the baggy filtering mediums must be constructed so that openings of the baggy filtering mediums don't communicate directly with exteriors of them. According to the present invention, the openings are joined tightly with a sleeve for installation into a housing to distinguish the supply fluid from the permeate fluid. It is natural that the sleeve must be installed into the housing so that it communicates with layered passageways for either of the supply fluid and the permeate fluid.

As mentioned already, it is inevitably necessary to join the sleeve for installation into the housing with every baggy filtering medium made of a porous thin film which replaces each of a series of layered elements together with every exterior layered passageway (material) positioned outside of every baggy filtering medium in order to construct a whole form of a filtration space in the housing, and moreover in order to secure a state of each opening of the baggy filtering medium, in other words, in order to secure thickness of every layered element. And it is not impossible to join every baggy filtering medium by adhesive or fusion with the sleeve at each opening whose shape fits to every opening of every baggy filtering medium to be maintained in a state of every required opening.

However, it is not always practical to join every baggy filtering medium with the sleeve as explained above, because it is very laborious to treat many and besides thin baggy filtering mediums without damage and moreover, it may happen frequently that various dusts penetrate into the baggy filtering mediums from surroundings while joining them. Therefore, there were investigated various joining technologies, considering importance joining the sleeve with baggy filtering mediums as well as passageway materials depending on necessity.

As the result, it became possible to apply and develop joining technologies which have been well known by bonding one or two terminal ends of a bundle of porous hollow fiber membranes. For example, as disclosed in Japanese Patent Application Publication Nos. 53-43390/1998 and 7-34850/1995 (corresponding to U.S. Pat. Nos. 4,980,060 and 5,066,397), there was applied and developed a technology manufacturing a filter element constructed from porous hollow fiber membranes and tube sheets, comprising of closing temporarily two terminal portions of porous hollow fiber membranes by means of a filling material before bundling them, fixing to bundle the terminal portions by applying an epoxy resin or a molten resin, cutting the bundled terminal portions in a rectangular direction with a lengthwise direction of hollow fiber membranes in order to obtain openings and removing the filling material from the bundled terminal portions.

According to the present invention, there was completed a similar way as cited in those patents that opening portions of the baggy filtering mediums having an incremental length were closed by bonding in advance before joining with a sleeve, instead of closing by the filling material like as inorganic or organic powders, so that an adhesive or a molten resin could not penetrate into the baggy filtering, mediums while forming the sleeve.

However, it is very difficult to fix without deformation a terminal portion constructed from baggy filtering mediums and passageway materials equipped with inside and/or outside of the baggy filtering mediums which is immersed into a liquid sealer like as an epoxy resin, a urethane resin, a molten resin.or the like contained in a vessel or the like and is solidified for a sleeve, because the terminal portion is very flexible before fixation, in comparison with a bundle of porous hollow fiber membranes, especially a bundle of porous hollow fiber membranes strengthened by the filling material. Accordingly, it is inevitably necessary to convert the terminal portion to be fixed to a rigid end by inserting in advance a rigid "support in the form of a belt (hereinafter referred to as belt-like support)" having a thickness equal to one of the interior passageway of the baggy filtering medium, into each baggy filtering medium at each incremental length portion, in series following an interior passageway material before bonding to close the opening portion.

At this time, there are applied various materials as a belt-like support for rigidity, which are stable mechanically and chemically under a joining condition and permit ease of cutting, for example, a belt of metal or synthetic plastic, especially polytetrafluoroethylene or the like. There is also preferably applied a certain material having a high melting point and a high thermal conductivity like as silver, copper or the like as the belt-like support in order to bond for fixation of the terminal portion under a uniform heating condition at the opening of the incremental length of a non-porous film where a liquid sealer cannot penetrate.

Figure 3:
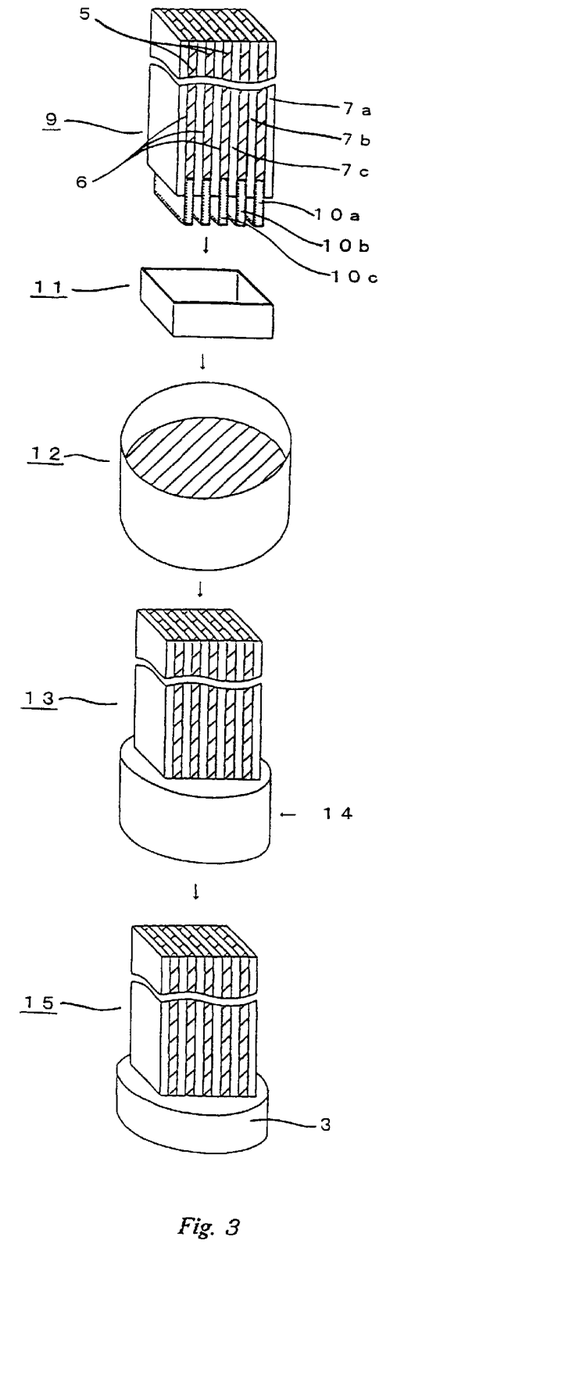
FIG. 3 is a manufacturing procedure of a filter element having a filtration space of a type of quadrangular prism and a cylindrical sleeve.

On the other hand, each exterior passageway material is extended along the baggy filtering medium from its bottom surface to a certain position within the incremental length, so that there is obtained a preferable crevice to be penetrated by a liquid sealer between every two baggy filtering mediums. In FIG. 3, there are crevices between 10a and 10b, 10b and 10c,—where exterior passageway materials 7a,7b, 7c,—do not extend (belt-like supports 10a, 10b, 10c,—are actually not visible). Following to the above, most exterior passageway materials are sandwiched to arrange their configuration between every two baggy filtering mediums containing the belt-like support so that a terminal portion to form into a sleeve for installation into a housing is shaped. In this case, one terminal portion of 9 in FIG. 3 may be formed into slightly small configuration, in comparison with the other portion revealing filtration function because there are compressed the exterior passageway materials at the portion of the incremental length by sandwiching force. There is, however, no problem because of no flow in the outside of the incremental length even though there are compressed the exterior passageway materials, while there is secured each space of the interior passageways by inserting the belt-like support to be removed later from the sleeve. However, it is acceptable in case of avoiding even a slight compression to control the terminal form by equipping with an auxiliary material having an appropriate thickness and rigidness at the extending portions of the exterior passageway materials.

Then it is preferable that the auxiliary material is identical with exterior passageway material and even though different from the exterior passageway material, it is necessary that the auxiliary material is similar to material of a sleeve for installation into a housing or baggy filtering mediums that is inactive in filtration because the auxiliary material remains in a filter element all the time after bonding. Moreover it is considerably preferable to bond the terminal portion to be fixed after its configuration is maintained by a thin frame, an annular band, a tape or a string or the like made from a material similar to a passageway material or another material having a lower melting point compared with the passageway material, for example as shown as 11 in FIG. 3.

Accordingly, it is possible that the terminal portion to be fixed is immersed by a fairly strong force in a liquid sealer to be solidified fluid-tightly and is formed into a precursor of the sleeve. In order to get openings communicating with the baggy filtering mediums at the fixed terminal portion, there are applied various cutting methods by means of various cutters, including a diamond cutter and a hot wire when the fixed terminal portion is constructed from synthetic resin which is to be cut by heat. Then there are removed from the opening portions the belt-like supports shortened in width, which remain at each shortened incremental length of the baggy filtering mediums because of cutting by means of cutters or heat. Because silver or copper as the belt-like material expands during heating for bonding so that it contacts tightly with each of the baggy filtering mediums, it is easy to maintain each baggy state and there is brought a merit that remaining belt-like material is easily removed from the opening portion due to shrinkage after cooling.

In case of needing no interior passageway materials inside of the baggy filtering mediums as mentioned already, in advance and temporarily there are inserted the passageway materials or alternative materials instead of them in the baggy filtering mediums without bonding because it is only necessary to arrange the formation of the filter element. Those materials remained in the baggy filtering mediums are removed from the openings formed after cutting in order to form a terminal portion into the sleeve for installation into the housing. In case of needing no exterior passageway materials outside of the baggy filtering mediums, it is necessary to bond short exterior passageway materials or alternative materials which are provided only at an incremental length of the baggy filtering medium, have each thickness to satisfy each interval between every two baggy filtering mediums and bring forward no problem in filtration even though remained, so that the formation of the filter element is arranged.

Thus, there is made a fixed terminal portion closing the openings of the baggy filtering mediums so that there is substantially no room that a liquid sealer can penetrate into the baggy filtering mediums or there are selected belt-like supports having appropriate shapes and quality so as to avoid that the sealer and belt-like supports bond to each other even though the sealer may penetrate a little into the baggy filtering mediums through the porous thin film. After cutting the fixed portion at right angles with a lengthwise direction by means of a cutter or heat, following to the above-mentioned bonding, what the baggy filtering mediums with openings join with a tube sheet is for the first time formed. According to the present invention, when the tube sheet itself is installed into the housing, the tube sheet is the very sleeve itself. Moreover, in a filter element fitting with a gasket, for example, an O-ring, a short tubular body fitting with an O-ring, which is separately molded and bonded to a tube sheet, is also a sleeve for installation into a housing. And it is acceptable in a disposable filter element that a sleeve for installation into a housing is not always tubular but also in various forms so long as it can be installed fluid-tightly into a housing to communicate with for filtration function.

It is not so laborious to make baggy filtering mediums of a porous thin film to construct a filter element as mentioned already when the number of them is small. However it takes much time to make carefully baggy filtering mediums as the number of them increases. Accordingly, when a series of layered elements obtained by dividing a filtration space of a housing in parallel with a lengthwise direction is equal in length of a lengthwise direction (or in depth), in order to avoid such a time-consuming affair, the filter element is to be constructed from one baggy filtering medium made of a porous thin film, which is uniform in depth and equips with passageway materials inside and outside. That is, the baggy filtering medium is folded repeatedly back and forth upon itself at right angles with a opening of the baggy filtering medium so as to reconstruct each of the series of the layered elements, formed into a shape of filtration space as a whole and joined with a sleeve so that a substantially parallel layered filter element for separation of solids from a supply fluid is also completed.

In the above-mentioned case that there is pleats-folded the baggy filtering medium with passageway materials inside and outside by repeating to fold back and forth upon itself, it is easily avoidable to wrinkle and cause tension about the baggy filtering medium, differing from a spiral wound bag filter element. At the same time, it is preferable to design that there is equal in thickness each of the series of layered elements to be constructed from the baggy filtering medium made of a porous thin film equipped with an interior passageway material, aid also there is equal in thickness each of the series of layered elements to be constructed from exterior passageway materials outside of the baggy filtering medium, that is, thickness of an exterior layered passageway.

Figure 2:
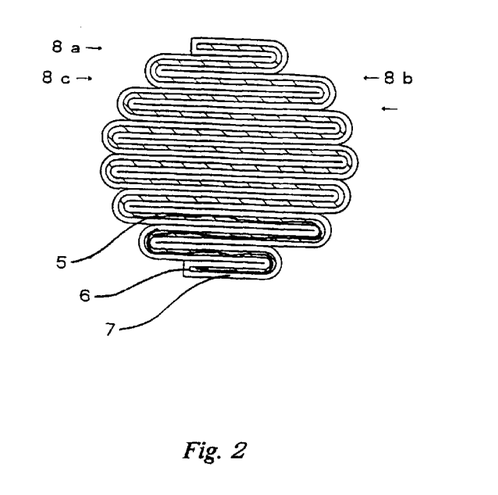
FIG. 2 is a cross sectional view obtained by cutting a filtration function portion at right angles with a lengthwise direction of a filter element, where one baggy filtering medium equipped with passageway materials on its both sides is pleats-folded.

There is shown in FIG. 2 a cross sectional view obtained by cutting a filtration function portion at right angles with a lengthwise direction of a filter element which is constructed in the form of a cylinder as a whole by folding repeatedly back and forth a double bag or a bag equipped with passageway materials at its two outsides. That is, an interior passageway material 5 shown by oblique lines in FIG. 2 is provided on the inside of the baggy filtering medium 6 and an exterior passageway material 7 is provided on the outside of the baggy filtering medium 6. When a supply fluid is fed from the outside of the folded baggy filtering mediums made of a porous thin film, there is a flow area similar to the baggy filtering mediums shown in FIG. 1, with respect to flow from bottom surfaces of the filter mediums. However, there is not a flow area equal to the baggy filtering mediums in FIG. 1, with respect to flow from a side area of a cylindrical filter element, that is, there are only flows from 8a, 8b, 8c,—in other words, there is not a reverse flow against 8b between 8a and 8c due to folding the baggy filtering medium, therefore the filter element shown in FIG. 2 is different from the filter element in FIG. 1 with respect to flow. However, the present invention is still superior to a spiral wound filter element because there is almost only a flow from a bottom surface in the state of a disc except one flow from outer periphery.

It is also possible to equip with interior and exterior passageway materials relevant to respective changes of these passageways in thickness of the series of layered elements.

When it is impossible in processing to make one baggy filtering medium made of a porous thin film having a broad opening, it is permissible that two or more baggy filtering mediums are laid side by side as if one baggy filtering medium exists and they are pleats-folded like as mentioned above, reproducing an above-mentioned series of layered elements. Moreover, it is also permissible two or more, but not so much, baggy filtering mediums equipped with passageway materials inside and outside are superimposed to repeat folding back and forth so as to form the shape of filtration space, for decrease of the number of folding operation. However, the number of superimposed baggy filtering mediums must be selected within a rang not causing wrinkle and tension so as not affect filtering function around folding portions. Openings of above-mentioned baggy filtering mediums can be joined with a sleeve for installation into a housing in line with the process already described.

In order to protect one (or a few) pleats-folded baggy filtering medium and a passageway material provided on the outside of it, it is acceptable like as described already that the filter element is wound around by a textile, a non-woven fabric or a net with a structure providing easy passage or enclosed by a tubular protecting cover with many big perforated holes made of synthetic plastic or metal, which may be preferably bonded to a sleeve for installation into a housing. In particular, as the latter protecting cover provide the filter element with strength and rigidity, according to the present invention, it results in preferably that the filter element can be treated without working direct force to a portion of layered structure.

In addition to that a housing and a filter element according to the present invention have been explained respectively and also clarified with the respect to each other in a filter assembly, there are summarized in detail material of the filter element as below though described sometimes so far.

First of all, a porous thin film making a baggy filtering medium is a porous membrane of a synthetic plastics which includes polyethylene, polypropylene, polyvinylidene fluoride, polytetrafluoroethylene; tetrafluoroethylene-hexafluoropropylene copolymer, tetrafluoroethylene-perfluoroalkylvinylether copolymer, tetrafluoroethylene-ethylene copolymer, polyethersulfone, polysulfone, polycarbonate, polyamide, polyethylene terephtalate and various cellulose esters and their improved porous membrane modified by coating physically and chemically their surfaces. And there can be also applied as a porous thin film various non-woven fabrics which are made from polypropylene, polyethylene terephtalate, polyamide and have fine penetrating crevices or pores from one surface to the other. Those non-woven fabrics have various pore sizes from 0.5 micrometer to 10 micrometer or more. A thickness of those porous thin film is not restricted so long as there is no wrinkle in making a baggy filtering medium or so long as there is not deformed the baggy filtering medium even though there are wrinkles a little, that is, preferably 10 micrometer to 500 micrometer.

Secondly, when a non-woven fabric is applied as a passageway material, there can be selected similarly, the above-mentioned non-woven fabrics as a material of the baggy filtering medium, and when a net is applied, there can be selected various synthetic plastics like as polyethylene, polypropylene, tetrafluoroethylene-perfluoroalkylvinylether copolymer, tetrafluoroethylene-ethylene copolymer, polyvinylidene fluoride, polyethylene terephtalate, polytetrafluoroethylene, polyether-etherketone, polyphenylenesulfide polyaramide, polyamide as well as metal like as steel and stainless steel.

Thirdly, there can be adopted as a material of a sleeve for installation into a housing, an epoxy resin, a urethane resin and various thermoplastic resins having a low molten temperature because of easy processing.

Fourthly, there can be adopted as a material of a film occupying an incremental length of a baggy filtering medium, thermoplastic resins having a similar or lower molten temperature in comparison with a baggy filtering medium.

It was a useful knowledge with respect to combination of material that material is selected to be as identical as possible so as to adapt to expansion of a filter element by heating or shrinkage by cooling when the filter element is used or applied under conditions of a broad temperature change.

Concretely describing, it is preferable for a filter element that all of a porous thin film, a passageway material of a non-woven fabric and a sleeve for installation into a housing is made from polypropylene and is constructed by means of fusion-bonding. And it is also said that all is made from polyethylene. It was also another useful knowledge with respect to combination of material that a material is preferably selected from fluorine-contained resin in order to provide a filter element with chemical resistivity, for example, a filter element is constructed form a baggy filtering medium of polytetrafluoroethylene, a net of tetrafluoroethylene-perfluoroalkylvinylether copolymer, a film as an incremental length of tetrafluoroethylene-perfluoroalkylvinylether copolymer, and a sleeve for installation into a housing of tetrafluoroethylene-perfluoroalkylvinylether copolymer. It is natural to apply those useful knowledges to a housing and an O-ring so long as possible, for example, an O-ring made from fluorine-contained rubber or various plastic elastomer coated by fluorine-contained plastic, like as developed so far.

There is shown one example of process making a tube sheet (that is, a sleeve for installation into a housing ) having openings in case of a filter element constructed from baggy filtering mediums made of a porous thin film occupying a filtration space of a prism shown in FIG. 3. There is shown in 9 of FIG. 3 a state that a filtration space is formed by sandwiching each of baggy filtering mediums between exterior passageway materials. Each of interior passageway materials 5 (actually not visible) is provided at a portion shown by oblique lines in each of baggy filtering mediums, moreover each of rigid belt-like supports 10a,10b,10c,— (actually not visible) shown by, dotted lines is provided in an extending portion that is an incremental length of the baggy filtering medium. A frame 11 in FIG. 3 around which a tube sheet is formed is used to maintain a configuration of 9, so that a force to immerse 9 in a liquid sealer shown in 12 is worked fully, and may be joined together with the tube sheet or removed after joining, depending on how to arrange 11. 13 in FIG. 3 shows a state that a cylindrical block to be named a precursor of the tube sheet having no opening is formed. By cutting the block at the position shown by an arrow 14 and at right angles with a lengthwise direction, the tube sheet is completed and product of a filter element is accomplished.

EXAMPLE 1

In order to make a cylindrical filter element with a radius of 38 mm, there was fashioned a series of baggy filtering mediums including their incremental lengths for construction of a tube sheet, which were made of porous polypropylene membrane by fusion-bonding. There were equipped with each interior passageway material and each belt-like support in series, in each baggy filtering medium and there was fusion-bonded each opening of the baggy filtering mediums. Each closed baggy filtering medium was sandwiched between two exterior passageway materials, arranged so that each bottom of the baggy filtering medium form a common plane and bundled in the form of a cylinder as a whole. Each of dimensions and properties was as below.

Porous polypropylene membrane: nominal pore size=0.5 micrometer, porosity=80%, thickness 80 micrometer; baggy filtering mediums: each length (or depth) including an incremental length in a lengthwise direction of the filter element=270 mm, each width=minimum 14.4 mm to maximum 76.0 mm, the number of the baggy filtering mediums= 82; interior passageway material: non-woven fabric made from melt blown polypropylene, metsuke (weight per area)= 20 g/m$^2$, air permeability=120 cm$^3$/cm$^2$/sec at pressure difference 1.27 cmH$_2$O, each length in a lengthwise direction of the filter element=254 mm, thickness=250 micrometer, each width=minimum 14.4 mm to maximum 76.0 mm, the number of the interior passageway materials= 82; belt-like support: polytetrafluoroethylene, width=16 mm equal to the incremental length, thickness=250 micrometer, each width=minimum 14.4 mm to maximum 76.0 mm, the number of the belt-like supports=82; exterior passageway material: identical material with interior passageway one, each length in a lengthwise direction of the filter element= 260 mm, each width=minimum 14.4 mm to maximum 76.0 mm; the number of the exterior passageways=83. In order to form a tube sheet, one terminal end of the cylinder was preheated nearly at molten point of polypropylene, immersed into molten polypropylene in a cylindrical vessel where an inner wall was coated by polytetrafluoroethylene and cooled to remove from the vessel. Then the cylindrical block was cut at right angles with a lengthwise direction of the baggy filtering element at the position that belt-like supports were divided into two pieces. Lastly polytetrafluoroethylene supports remained in baggy filtering mediums after cutting were removed in order to obtain openings which existed in parallel in the circular plane of the tube sheet. As the result, the tube sheet with a thickness of 10 mm was formed, that is to say, the filter element of baggy filtering mediums made of porous polypropylene membrane was completed, like as shown in FIG. 1. A filtration area per unit lengthwise length of filtration space in the filter element was about $9.8 \times 10^3$ mm$^2$/mm.

EXAMPLE 2

In order to make another cylindrical filter element with a radius of 38 mm applying, the materials in Example 1, there was fashioned only one baggy filtering medium including its incremental length for construction of a tube sheet, which was in the form of a wide bag (width=$4.9 \times 10^3$ mm) made of a porous polypropylene membrane with 80 micrometer in thickness by fusion-bonding. There was equipped with an interior passageway material and a belt-like support in series, in the baggy filtering medium and there was fusion-bonded an opening of the baggy filtering medium. The closed baggy filtering medium was inserted tightly into a bag made of an exterior passageway material identical with the interior passageway material and folded repeatedly back and forth upon itself, in other words, pleats-folded so as to form the cylinder as a whole, herein the folding number was 81. Namely, it was arranged as if its cross-sectional view obtained by cutting a portion of filtration function of the filter element at right angles with its lengthwise direction was like as shown in FIG. 2. A tube sheet was formed by a similar procedure to Example 1. Each dimension and property was as below. The baggy, filtering medium made of porous polypropylene membrane, an interior passageway material, an exterior passageway material, and a belt-like support were 270 mm, 254 mm, 265 mm and 16 mm in length respectively and each thickness of them was 410 (=80+250+80) micrometer, 250 micrometer, 250 micrometer and 250 micrometer respectively. A filtration area per unit lengthwise length of filtration space in the filter element was about $9.8 \times 10^3$ mm$^2$/mm.

EXAMPLE 3

In order to make another cylindrical filter element with a radius of 38 mm like as Example 2, there was fashioned only one baggy filtering medium including its incremental length for construction of a tube sheet, which was in the form of a wide bag (width=$4.9 \times 10^3$ mm) made of a porous polytetrafluoroethylene membrane by fusion-bonding. At this time, a copolymer film of tetrafluoroethylene-hexafluoropropylene having 10 mm in width was superimposed between the edges of the membrane because it is difficult to bond directly them with each other. In the present Example, a net made from a copolymer of tetrafluoroethylene-perfluoroalkylvinylether was applied as an interior passageway material and an exterior passageway material instead of a non-woven fabric of polypropylene in the Example 2 and a tube sheet was formed from a copolymer of tetrafluoroethylene-perfluoroalkylvinylether instead of polypropylene. The net is 120 micrometer in diameter of a fiber, 245 micrometer in sieve opening (defined as a square root of a mesh area enclosed between both of adjacent warps and adjacent wefts) and 250 micrometer in observed thickness. Each dimension was almost similar to Example 2 except the superimposed film.

COMPARATIVE EXAMPLE

There were fashioned two conventional filter elements constituting a folded tubular membrane sandwiched by two sheets of non-woven fabric, which was 38 mm in outer radius and 23 mm in inner radius. Their materials are as same as ones in Example 1. The number of pleats in one filter element was 127 that was its upper limit having an axis of revolution symmetry without compression of the non-woven fabric sheets. And its filtration area was only $3.8 \times 10^3$ mm$^2$/mm. The number of pleats in the other filter element was 180 that was its maximum limit when the nonwoven fabric sheets were compressed in a space occupied by the filter element as many as possible. And its filtration area was $5.0 \times 10^3$ mm$^2$/mm. A pressure drop of water flow through the latter filter element having a length of 254 mm at its flow rate of 0.020 m$^3$/min was higher than ones through the filter elements having the same length shown in Examples 1 and 2 by about 2 times, after these filter elements were provided with hydrophilic treatment.

As illustrated so far, the filter element according to the present invention for separation of solids from a fluid containing the solids is regarded that there is removed a central opening space occupying a filtration space in ruin to a considerable extent in an aforementioned folded tubular membrane filter element, that though another aforementioned spiral wound bag filter element has no central opening, there are eliminated various faults resulted from the spiral wound bag filter element, that is, occurrence of wrinkle and tension, a restricted flow through a bottom surface and an outer periphery (not penetrating into a central portion), and that there are appropriately designed dimensions of interior and exterior passageways in comparison with an aforementioned bundled porous hollow fiber membranes filter element.

Besides in the filter element, in other words, in the layered bag filter element according to the present invention, a great filtration area per unit optional filtration space can be obtained.

What I claim is:

1. A filter element to be installed into a housing in order to constitute a filter assembly for separation of solids from a fluid, comprising a plurality of bag-shaped filtering mediums made of a porous thin film, wherein each bag shaped filtering medium includes a pair of major planar surfaces that are parallel to each other, each said bag-shaped filter medium having an interior layered passageway material on an inside thereof and each of two exterior layered passageway materials an outside thereof and in contact with a respective said major planar surface, each of said bag-shaped filtering mediums including an open end portion that is free of said interior layered passage material and that extends axially beyond adjacent end portions of said exterior passageway materials, said open end portions including outer peripheral surfaces that are surrounded by and joined fluid-tightly with a sleeve for installation into said housing.

2. A filter element to be installed into a housing in order to constitute a filter assembly for separation of solids from a fluid, comprising a bag-shaped filtering medium made of a porous thin film having an interior layered passageway material on an inside thereof and each of two exterior layered passageway materials on an outside thereof, which is folded repeatedly back and forth upon itself in parallel with a lengthwise direction thereof, said bag-shaped filter medium including an open end portion that is free of said interior layered passage material and that extends axially beyond adjacent end portions of said exterior passageway materials, said open end portion including an outer peripheral surface that is surrounded by and joined fluid-tightly with a sleeve for installation into said housing.

3. A filter element according to claim 1 or 2, wherein said filter element is cylindrical.

4. A filter element according to claim 1 wherein said sleeve is formed by a solidified molten resin.

5. A filter element according to claim 2 wherein said sleeve is formed by a solidified molten resin.

* * * * *